United States Patent [19]
Sakai et al.

[11] Patent Number: 5,482,906
[45] Date of Patent: Jan. 9, 1996

[54] ADSORPTION MATERIAL COMPRISING ACTIVATED CARBON FIBER AND POLYTETRAFLUOROETHYLENE

[75] Inventors: Naoki Sakai; Tetsuro Shigei; Takayuki Tanaka, all of Shizuoka, Japan

[73] Assignee: Toho Tayon Co., Ltd., Tokyo, Japan

[21] Appl. No.: 259,061

[22] Filed: Jun. 13, 1994

[30] Foreign Application Priority Data

Dec. 28, 1993 [JP] Japan ................... 5-353479

[51] Int. Cl.$^6$ .................. B01J 20/26; B01J 20/02
[52] U.S. Cl. .......................... 502/402; 502/417
[58] Field of Search ..................... 502/402, 417

[56] References Cited

U.S. PATENT DOCUMENTS

| | | | |
|---|---|---|---|
| 3,838,064 | 9/1974 | Vogt et al. | 252/385 |
| 4,112,037 | 9/1978 | Parker et al. | 264/126 |
| 5,192,604 | 3/1993 | Giglia | 428/224 |
| 5,277,729 | 1/1994 | Endo et al. | 264/104 |

*Primary Examiner*—E. Rollins Cross
*Assistant Examiner*—Nhat D. Phan
*Attorney, Agent, or Firm*—Sughrue, Mion, Zinn, Macpeak & Seas

[57] ABSTRACT

An adsorption material and process for producing the same is disclosed, comprising milled activated carbon fiber and together by fibrils of a polytetrafluoroethylene resin. The adsorption material has high tensile strength and elongation and good softness. Furthermore, the adsorption material has high adsorptivity, high packing density and good gas permeability.

28 Claims, 7 Drawing Sheets

ADSORPTION MATERIAL COMPRISING ACTIVATED CARBON FIBER AND POLYTETRAFLUOROETHYLENE

FIELD OF THE INVENTION

The present invention relates to an adsorption material comprising activated carbon fiber (hereinafter referred to as ACF) and a fibrillating polytetrafluoroethylene resin (hereinafter polytetrafluoroethylene resin is referred to as PTFE). More particularly, the present invention relates to an adsorption material comprising ACF and a PTFE having a high bulk density and a high mechanical strength, which adsorption material forms less black dust on handling and may be formed into various shapes. The present invention further relates to a method of preparing the adsorption material.

BACKGROUND OF THE INVENTION

Air pollution is harmful not only to health but to electrical equipment. The corrosive components of polluted air, such as $SO_x$ and $NO_x$, can corrode the electronic circuits of computers, wiring and junctions, thereby leading to disorders or errors.

A known countermeasure is to fit an adsorbing element packed with activated carbon into the vent holes or inside of electrical equipment to prevent pollutants from entering or to adsorb pollutants that have entered.

However, a conventional adsorbing element packed with powdered or granular activated carbon as such tends to generate electrically conductive dust. If the dust enters electrical equipment, it can induce a short-circuit. In addition, powdered or granular activated carbon that is merely packed into housing must be used in a large quantity to sufficiently remove pollutants. Therefore such an adsorbing element becomes bulky.

To overcome the above noted disadvantages associated with an adsorbing element using granular or powdered activated carbon, special measures are necessary to prevent dust from entering electrical equipment, including for example, tight sealing around the adsorbent with a porous membrane filter. In order to prevent dusting or improving adsorptivity, it has been proposed to set powdered activated carbon with a resin or to impregnate powdered activated carbon with a chemical. However, use of a resin-set powdered or granular activated carbon in an air flow path disadvantageously results in a large pressure drop, and those impregnated with a chemical suffer from release of the chemical into the surrounding equipment over time.

On the other hand, ACF has recently been developed. This is expected to be a promising adsorbent because of its high rate of adsorption based on a large outer surface area and superiority to powdered or granular activated carbon in adsorptivity per unit weight. Fabric or paper-like articles made of activated carbon fiber are bulky due to a low packing density of, for example about 0.1 g/cm$^3$. Pieces of activated carbon fiber in a fabric or paper form tends to break off and generate dust. Fabric or paper-like activated carbon fiber is not easily fabricated into a desired shape and tends to break apart when cut into pieces to thereby generate dust. As a result, it is difficult to make fabric or paper-like activated carbon fiber into a compact adsorbent for use as an adsorbing element for electrical equipment. The above noted properties also limit size reduction of an adsorbing element. In a manner similar to the aforesaid powdered or granular activated carbon, fabric or paper-like activated carbon fiber must be tightly sealed to prevent when used as an adsorbing element for electrical equipment.

On the other hand, powdered or granular activated carbon is difficult to mold. Known molded articles of powdered or granular activated carbon include a honeycomb structure and a structure comprising activated carbon that is supported on an urethane article. In recent years, an activated carbon sheet comprising activated carbon powder and a fibrillating fluorine resin that forms fibrils has been proposed in JP-P-3-122008, JP-A-3-228813, and JP-A-3-228814 (the term "JP-A" as used herein means an "unexamined published Japanese patent application"). According to these techniques, PTFE is fibrillated to form a network structure (of fibrils), and activated carbon particles are taken up into the network structure so as to retain their activity without being coated with PTFE.

A conventional ACF sheet has a low packing density, as low as about 0.1 g/cm, due to the bulkiness of an ACF sheet. Thus, ACF molded articles disadvantageously have low packing density and are bulky. Moreover, an ACF has low fibrous strength and is brittle. Thus, when shaped into a sheet, the fibers break into fine particles and tend to fall off as black dust.

Paper formed from ACF should desirably have a high ACF content for ensuring high adsorptivity. However, an increase in ACF content causes an increase of black dust and a reduction in paper strength. For this reason, the upper permissible ACF content has been limited to 70 to 80 % by weight.

As an ACF-containing material for adsorbents, a filter sheet comprising ACF and rigid micro-fibrillated organic synthetic fiber such as fiber obtained from a poly(p-phenyleneterephthalamide) also has been proposed (see JP-A-3-202108). This filter sheet, which is prepared by previously mixing ACF and micro-fibrillated fiber and then making the mixture into paper, is basically a kind of paper. As a result the filter sheet lacks general-purpose processability.

When activated carbon powder is molded into a sheet together with a fibrillating fluorine resin as mentioned above, the packing density of the activated carbon powder is greately increased, and the resulting sheet like wise has an increased packing density. It follows that use of the adsorption sheet thus obtained in an air flow path causes an increased pressure drop. In order to ameliorate this drawback, a special means for controlling the packing density in an activated carbon sheet has been desired.

For example, the activated carbon sheet using powdered activated carbon, disclosed in JP-A-3-228813, is produced by kneading powdered activated carbon with a fibrillating fluorine resin, easily water-soluble inorganic salt powder, and an alcohol kneading aid, molding the mixture, and then dissolving and removing the inorganic salt to thereby reduce the packing density. The subject publication describes that the molded article produced by adding easily water-soluble inorganic salt powder has a bulk density (the same as a packing density) of 0.35 g/ml and exerts less pressure drop.

In order to reduce the packing density of an activated carbon sheet containing powdered activated carbon, JP-A-228814 teaches a method of preparing the sheet without using rollers for molding the sheet. In this method, the sheet is prepared by a paper making process and the sheet is subjected to a hot-pressing treatment at a temperature of 250° C. or higher and a pressure of 10 kg/cm$^2$ or higher. The publication discloses that the bulk density (the same as a packing density) of the thus produced activated carbon sheet is approximately less than 0.5 g/cm$^3$, while a sheet prepared by using rollers has a bulk density of 0.65 g/cm³ and exerts a greater pressure loss.

However, the above-mentioned steps for reducing packing density tend to induce contamination of activated carbon with the salt or the alcohol used to prepare the sheet, and the resulting molded articles have limited porosity.

SUMMARY OF THE INVENTION

An object of the present invention is to provide an adsorption material having a high bulk density and a high mechanical strength, which adsorption material forms less black dust, retains activity essential to ACF, provides less pressure drop and is easily foamed into various shapes.

A second object of the present invention is to provide a process for producing an adsorption material having the above-described characteristics.

These objects can be attained by a adsorption material comprising of milled ACF bound together by fibrils of PTFE; and a process for producing the above described adsorption material, mixing milled activated carbon fiber and a fibrillating polytetrafluoroethylene resin, and then applying compressive shear stress to the mixture to fibrilate the polytetrafluoroethylene resin.

DETAILED DESCRIPTION OF THE INVENTION

Figure 1:
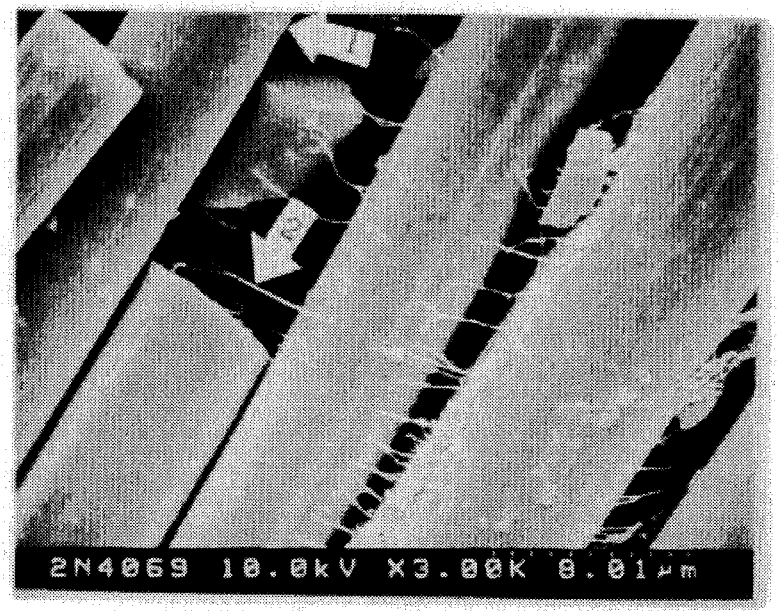
FIG. 1 is a scanning electron microscope (SEM) photograph of a surface of the adsorption material of the present invention.

The adsorption material of the present invention is easily fabricated into various shapes without impairing activity essential Lo ACF, and furthermore provides an adsorption article having good permeability to liquid or gas and excellent strength.

The adsorption material of the present invention is porous without introducing any special treatment step therefor, and upon use as an adsorbent exerts a lower pressure drop.

The term "ACF" as used herein means activated carbon fiber in its art recognized sense, i.e., porous carbon fiber obtained from organic fiber through a treatment for rendering the same non-fusible, a carbonization treatment and an activation treatment.

ACF is classified by the starting material used to prepare the same including a polyacrylonitrile type (PAN type), a phenol type, a pitch type, a rayon type, etc. Any of these types of ACF is suitable to use in the present invention. Of the ACF types, PAN type ACF is particularly preferred in the present invention in view of its high strength and general-purpose properties.

PAN type ACF can be prepared by, for example, the process described in JP-A-51-137694, U.S. Pat. Nos. 4,256,607, 4,285,831, 4,362,646, 4,366,085, 4,412,937, 4,460,650, 4,508,851, and 4,520,623.

Taking $SO_x$ and $NO_x$ adsorptivity into consideration, acrylic type activated carbon fiber having a basic group content of not less than 180 mg/g has excellent $SO_x$ adsorptivity (due to the basic group), as disclosed in JP-A-54-86490, and acrylic type activated carbon fiber having a nitrogen content of from 4 to 15% by weight has excellent $NO_x$ adsorptivity (due to the nitrogen-containing functional group), as disclosed in JP-B-56-37865 (the term "JP-B-as used herein means a "examined published Japanese patent application").

ACF used in the present invention has a specific surface area of preferably at least 400 cm²/g, more preferably at least 600 cm²/g, and most preferably at least 800 cm²/g, a tensile strength of preferably at least 10 Kgf/mm², more preferably at least 20 Kgf/mm², and most preferably at least 30 Kgf/mm², and an average diameter preferably from 2 to 50 μm, more preferably from 3 to 20 μm, most preferably from 5 to 15 μm, When the average diameter is less then 2 μm, the packing density tends to become extremely large, whereas when the average diameter is mere than 50 μm, it is difficult to obtain an adsorption sheet having sufficient tensile strength.

The term "fibrillating PTFE" as used herein means PTFE that is capable of forming extremely fine fibrils having a diameter of not more than about 1 μm upon application of a shear stress. Such fibrillating PTFE includes known homopolymers of tetrafluoroethylene having a high molecular weight that are obtained by emulsion polymerization. PTFE materials disclosed in U.S. Pat. Nos. 3,281,511, 3,864,124, 4,194,040, and 5,277,729, JP-A-3-122008, JP-A-3-228813, JP-A-3-228814, and JP-B-52-32877 can be used in the present invention. Commercially avairable fibrillating PTFE suitable for use in the present invention are Teflon K10-J and Teflon K20-J. There materials are dust-preventing agents avairable from Du Pont-Mitsui Fluorochemicals Co., Ltd. Teflon K10-J is a powder having an average particle size of 500 μm, and Teflon K20-J is an aqueous suspension having an average particle size of 0.2 μm. It is important to use such fibrillating PTFE comprising dispersible fine particles which are uniformly miscible with ACF.

The terminology "bound" as used herein means the state of ACF in the adsorption material where ACF are entangled in fibrils developed from PTFE and united into a single body. FIG. 1 shows a photograph of the adsorption material of the present invention taken with a scanning electron microscope (SEM). The fiber indicated by arrow 1 is ACF, and the fine fibril indicated by arrow 2 is a PTFE fibril entangling the ACF. As shown by FIG. 1, ACF is bound together with thread-like PTFE fibrils in the form of a spiders web. It can be seen that fibrils are bound to ACF by melt-adhering. PTFE is attached to only a small part of the ACF surface, leaving most of the surface of ACF exposed. Consequently thus seen that the adsorptivity of ACF is retained.

The adsorption material of the present invention can be produced by the following method.

The length distribution of ACF used for preparing the adsorption material is not particularly limited. However, in order to make the production operation simple and to retain the adsorption characteristic of ACF to a large extent, the ACF to be mixed with the PTFE resin is milled to a length distribution approximately the same as the desired length distribution of the adsorption material.

The length distribution of the of ACF is measured using a light-scattering method as disclosed in detail hereinafter.

The length of each of the ACF in the adsorption material is preferably within the range of from 10 to 1,000 μm, more preferably from 20 to 500 μm, and most preferably from 30 to 200 μm. In the present invention, the content of the ACF having a ratio (L/D)of the length of the ACF to the average diameter of the ACF of at least 3 is preferably at least 20 wt % (based on the total amount of the ACF in the adsorption material), more preferably from 30 to 60 wt %, and most preferably 40 to 50 wt %.

When the content of the ACF having a L/D of at least 3 is less than 20 wt %, the packing density tends to too large, and when the content exceeds 80 wt %, the mechanical strengths tend to be low.

The content of ACF having a L/D ratio of at least 3 can be controlled by adjusting conditions of application of shear stress to the mixture of milled ACF and PTFE. The conditions can be easily found by repeating experiments.

The PTFE content in the adsorption material is preferably from 0.5 to 50 wt %, more preferably from 2 to 30 wt % and most preferably from 5 to 20 wt % based on the total weight of the adsorption material.

If the content of fibrillating PTFE is less than 0.5 wt %, the binding among ACF would be too weak to obtain sufficient shapability. In order to obtain an adsorptic material having a sufficient tensile strength when it is shaped into a sheet, the amount of PTFE is preferably not less than 2 wt %. If the fibrillating resin content exceeds 50% by weight, the packing density and pressure drop increased and adsorptivity is reduced.

Generally, milled ACF and fibrillating PTFE are mixed at a temperature not higher than 80° C. and preferably not higher than 50° C. so that the fibrillating PTFE particles do not gather into lumps. Mixing may be conducted using either a wet process or a dry process.

Wet mixing is carried out by adding prescribed amounts of milled ACF and fibrillating PTFE powder or a dispersion of the powder to water, and stirring the mixture until the mixture becomes uniform. It is desirable to use clean water. Otherwise, impurities in the water will be adsorbed onto the surface of the ACF to reduce its adsorptivity. It is possible although not preferable to use dispersing liquid media other than water, such as an aquious solution of an inorganic salt or organic solvents (e.g., an alcohol such as ethyl alcohol, and propyl alcohol) in which fibrillating PTFE is insoluble. Such solvents tend to induce contamination or denaturation of ACF and often harmful to human body. The liquid media used in the mixture is usually from 100 to 500 wt % based on the total weight of the ACF. In wet mixing, the mixing is followed by drying. Where water is used, drying is preferably conducted at 80° to 120° C. The dying may also serve as a heating step prior to application of a compressive shear stress. It is preferred that the drying is conducted until the water or other liquid content (including water adsorped by ACF) in the mixture becomes less than 40 wt %, more preferably less than 10 wt % based on the total weight of the mixture.

Dry mixing can be carried out simply by stirring weighed amounts of milled ACF and fibrillating PTFE powder until the mixture becomes uniform.

A compressive shear stress is then applied to the resulting uniform mixture of the ACF and the fibrillating PTFE. The term "shear stress" as used herein means a force needed subject the mixture of the ACF and the fibrillating PTFE to a shear action. The term "shear action" is an action of mutually scratching ACF and fibrillating PTFE in intimate contact based on the velocity difference among fibers which contact to each other through PTFE. On applying a compressive shear stress (the term "shear stress" is used in the same meaning in the present invention) to the ACF-fibrillating PTFE mixture, the fibrillating PTFE is fibrillated, and the ACF is bound together with PTFE fibrils.

The application of shear stress is usually conducted at a temperature of 20° C. to 320° C.

Heating during shear stress application facilitates fibrillation and is effective to prevent size reduction of ACF when reduced application of the shear stress is desired. A preferred temperature is from 50° C. to 250° C., and more preferred is from 80° C. to 200° C. At temperatures higher than 320° C., the fibrils are softened and tend to be cut, result in insufficient binding.

Shear stress application can be effected by means of any apparatus preferably capable of conducting milling of ACF, mixing of the milled ACF and a PTFE (in the state of a powder or a dispersion), stirring the mixture, and kneading under compression. For example, a mortar may be used.

Apparatus suitable for carrying out compressive shear stress application on an industrial scale include an automatic mortar, a screw kneader, a ball mill, a roll mill (having at least two rollers), and a stirrer equipped with a rotary blade. Rolling by means of a roller or kneading in an extruder is effective to apply a hear stress while accelerating shaping.

As a proper shear stress is applied to the ACF-fibrillating PTFE mixture, PTFE fibrils begin to form. At that point, the mixture tends to agglomerate and appears wet, and then becomes a plastic material like clay. Shear stress is applied until sufficient plasticity is developed.

A treatment for a period of about 1 to 10 minutes generally suffices while depending on the stirring or mixing conditions. The network structure formed of PTFE fibriles varies depending on the ACF used. A network structure readily develops where ACF has conditions suitable for entanglement in terms of diameter, length, and the amount of ACF having proper L/D ratio as described above. To take advantage of this tendency, ACF may be cut to an appropriate length before mixing. ACF may be broken simultaneously upon the fibrillation process of PTFE until it has the optimum fiber length or optimum fiber length distribution.

When rollers are used to apply compressive shear stress to the mixture of ACF and a PTFE, the nip size (the size of the slit between two rollers), of a pair of rollers is preferably at least from 5 to 40 times the diameter of ACF. The nip size is more preferably 10 to 20 times the diameter of ACF to allow for fabrillation proceed effectively and to prevent milling of ACF to a shorter length. The linear speeds of the surfaces of the two rollers should be different so that fibrillation proceeds efficiently. The ratio of the linear speeds of the surfaces of the two rollers is preferably more than 1.0 and not more than 3.0. For fibrillation to proceed efficiently the ratio is more preferably at least 1.5. When the ratio exceeds 3.0, ACF tends to be broken. When the ratio is too large ACF tends to be milled to shorter lengths.

The application of shear stress to the mixture is conducted until sufficient fibrillation of the PTFE is effected to thereby obtain the desired tensile strength and tensile elongation of the product. In the present invention by applying shear stress to an appropriate extent, an adsorption material having extremely high tensile strength and elongation can be obtained. By continuing application of the shear stress to the mixture, the tensile strength and tensile elongation of the material are gradually increased. However, after reaching a maximum tensile strength and tensile elongation, the strength and the elongation begin to gradually decrease due to cutting of fibils formed by he application of shear stress. The maximum tensile strength and the maximum elongation can be easily determined by conducting a series of experiments.

In order to obtain the desired tensile strength and elongation, the shear stress should be applied until the tensile strength preferably becomes at least 5 $g/mm^2$, more preferably 10 $g/mm^2$, and most preferably at least 20 $g/mm^2$. According to the present invention an adsorption material having a tensile strength of about 500 $g/mm^2$ or higher can be obtained. The elongation increases with an increase in tensile strength. The tensile elongation is preferably at least about 10%, more preferably at least 20%, and most preferably at least 30%. According to the present invention, as described below in detail, an adsorption material having tensile elongation of 60% or more (as high as 70%) can be obtained.

After applying a shearing stress, for example, using a roll mill, the mixture in the form of a flaky material in which ACF are bound together with PTFE fibrils. The adsorption material of the present invention exhibits high elongation and good thermoplasticity even after the formation of fibrils. Generally, the fibrillation operation using a roll mill is conducted by repeatedly passing the flaky material through the roll mill about 5 times to about 10 times.

The flaky material is then gathered and shaped, for example, into a sheet. While not limiting, gathering of the flakes is usually conducted by piling the flakes and passing the pile through heated rolls at the same linear speed.

The length distribution of the ACF shifts to a shorter length distribution range by application of compressive shear stress. The step of the application of shear stress to the mixture is preferably also used to control the ACF length distribution properly as described hereinbefore, as well as to obtain sufficient fibrillation, in order to obtain excellent tensile strength and tensile elongation.

The thus obtained mixture is unually subjected to shaping using pressing rollers comprising at least two rollers having the same linear surface speed to obtain a sheet. Upon shaping in this manner, by the application of shear stress to the material, the tensile strength and the tensile elongation of the material can be further increased. The temperature upon shaping is preferably from about 20° to about 320° C., more preferably from about 50° to about 250° C., and most preferably from about 80° to 200° C. When the temperature is lower than 20° C., plasticity of the material is not sufficient for shaping the material. On the other hand when the temperature is higher than 320° C., PTFE fibrils tend to be cut. When the temperature of the material is 80° C. or higher, elongation of the material is high. From the point of view of easy operation, the most preferred temperature is from 80° C. to 200° C. is the most preferred temperature.

Figure 2:
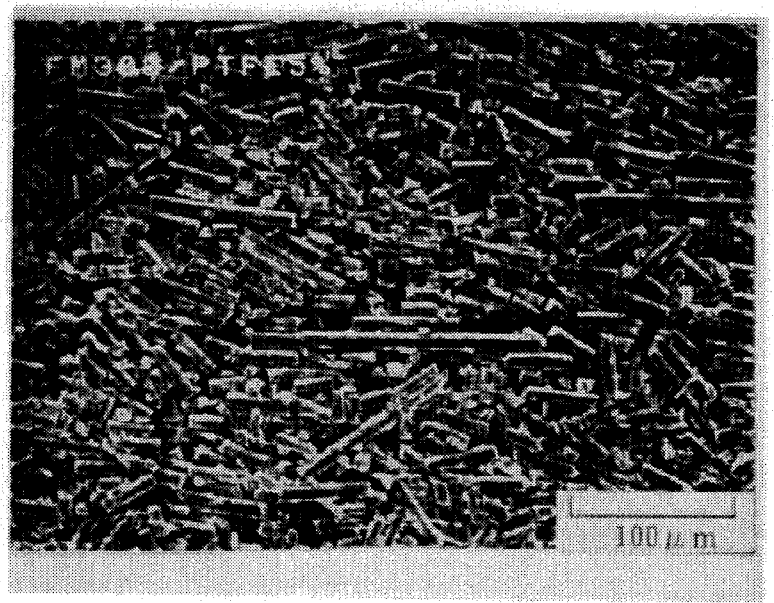
FIG. 2 is a SEM photograph of the surface of the adsorption sheet obtained in Example 1.
Figure 3:
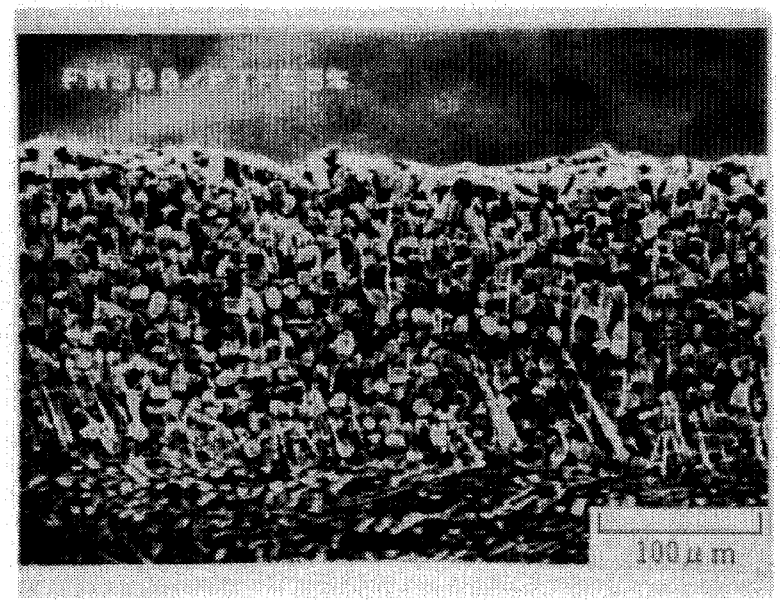
FIG. 3 is a SEM photograph of the cross section of the adsorption sheet obtained in Example 1.

FIGS. 2 and 3 each shows an SEM photograph of the surface and the cross section of the adsorption sheet, respectively. It is seen that the sheet, though porous, constitutes a cluster of short fibers and therefore has a high packing density. Such a sheeting structure is unique to the present invention, differing from conventional paper or resin film.

In the production of the adsorption material in a form of a sheet, the orientation of ACF can be controlled by adjusting the direction of the application of compressive shear stress and/or the direction of the roll pressing. ACF tends to orient in the same direction with shear stress under these conditions. By processing in a single direction repeatedly, a sheet containing ACF highly oriented in one direction is obtained. On the other hand, by processing in various directions, for example, two directions crossing at a right angle to one other, a sheet having randomly oriented ACF is obtained. When the sheet contains a larger content of ACF approximately oriented in a single direction, the tensile strength in that direction is larger than the tensile strength at a right angle direction thereto. On the other hand, the tensile elongation in the former direction is smaller than the tensile elongation in the latter direction.

When the sheet contains ACF oriented at random, a sheet having a tensile strength in any direction that is higher than the tensile strength of the oriented sheet described above can be obtained, and a high tensile elongation in any direction can also be obtained. That is, in such a sheet the tensile strength and tensile elongation are high and uniform in all directions which results in excellent processability.

The thickness of the sheet can be controlled to a desired thickness. The thickness of the adsorption sheet is preferably from 1 to 0.1 mm from the point of view of processability, but it may be reduced to as little as 0.02 mm.

The packing density of the adsorption material of the present invention can be controlled to a desired value. It is preferably controlled to 0.3 to 1.0 $g/cm^3$, more preferably 0.4 to 1.0 $g/cm^3$, and most preferably 0.6 to 0.8 $g/cm^3$. When the density is less than 0.3 $g/cm^3$, it is difficult to obtain sufficient tensile strength and tensile elongation. On the other hand, when the density exceeds 1.0 $g/cm^3$, the pressure drop increases.

The sheet thus obtained can be used as an adsorption sheet. The sheet may be further fabricated into a desired shape for absorption of a specific gas, liquid or fine solid particles by cutting c,r punching, or shaping into a heneycomb structure. Since the adsorption material of the present invention has activities the same as that of conventional ACF, it can be used as a catalyst, for example, for decomposition of ozone or active chlorine such as $Cl_2$ or HClO in tap water.

When the adsorption material of the present invention is used for filtering a gas, the pressure drop can be reduced to less than 1,000 mm $H_2O$, and may be reduced to 500 mm $H_2O$ or less.

The adsorption material of the present invention may contain various additives. For example, carbonaceous conductive materials, such as graphite, carbon black, carbon fiber, and graphite fiber, are preferably used to impart chemical resistance to the material and for production of, for example, an electrode. The proportion of the conductive powder or carbon fiber to ACF is selected depending on the desired characteristics. Generally, the additives are used in an amount of not more than 80wt %, more preferably not more than 50wt % based on the total weight of ACF and the additive. The powder or fiber preferably has an average particle size or fiber diameter of less than 50 μm. Powder or fiber of greater size would be too large, as compared to the length of the fibrils, to be sufficiently bound.

In order to increase tensile elongation of the adsorption material of the present invention, compressive shear stress is effectively applied to the mixture of ACF and the PTFE in the presence of carbon powder. In some cases, for example, when the selection of the preparation conditions of the adsorption material are restricted, or when ACF length distribution which is proper for obtaining sufficient PTFE fibrillation can not be easily obtained (due to, for example, a comparative large length or diameter of ACF, or due to ACF characteristics such as tensile strength, tensile elongation, or brittleness), it is difficult to form sufficient network structure of fibrils to obtain an adsorption material having a tensile elongation higher than 10%. In such a case, however, by using carbon powder as described above a higher tensile elongation can be easily obtained.

The particles of carbon powder preferably have an average size (the average size of major axis, i.e., the longer axis) of not greater than the fiber diameter of ACF constituting the adsorption material of the present invention for the following reason. As long as the particle size of carbon powder is less than the ACF fiber diameter, the carbon powder fills the gaps among ACF fibers to transmit a shear stress. This accelerates formation of PTFE fibrils among ACF fibers. Suitable carbon powders include powdered activated carbon, powdered graphite, and carbon black. In order to obtain a higher adsorbing ability, it is preferred to use activated carbon powder. It is also preferable to use ACF or carbon fiber having a fiber diameter of at least 2 μm and less than 50 μm, after grinding to a powder having a size smaller than the ACF fiber diameter. The average size of carbon powder is preferably from 0.1 to 20 μm and more preferably from 1 to 10 μm. When the size is less than 0.1 μm, the contact efficiency of the carbon particle with ACF is not sufficient, on the other hand, when the average size exceeds 50 μm, the tensile elongation tends to lower. The shape of the particles is preferably sphere, irregular or tabular.

Figure 4:
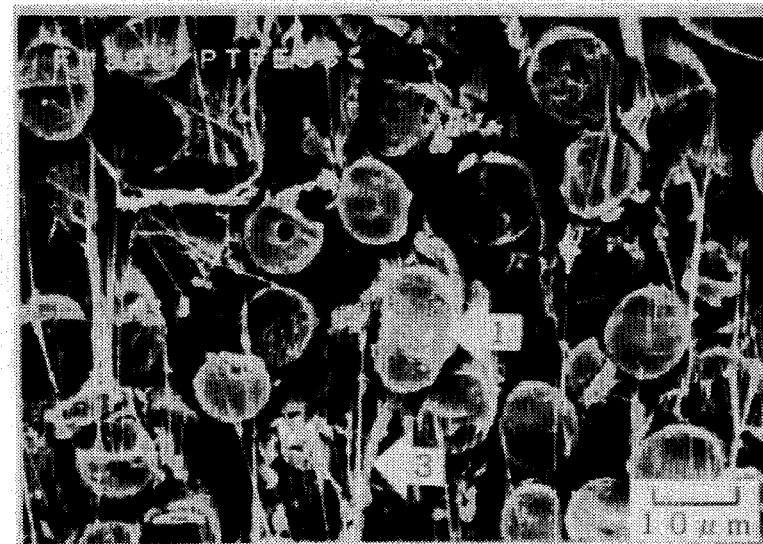
FIG. 4 is a SEM photograph of the cross section of an adsorption sheet comprising ACF and PTFE.

FIG. 4 shows a SEM photograph of the cross section of an adsorption sheet comprising ACF and a PTFE. The fiber indicated by arrow 1 is ACF, and the fine fibril indicated by arrow 3 is a PTFE fibril mutually entangling the ACF.

Figure 5:
FIG. 5 is a SEM photograph of the cross section of the adsorption sheet obtained from an adsorption material containing ACF, PTFE and carbon powder.

FIG. 5 shows an SEM photograph of the cross section of an adsorption sheet obtained from an adsorption material containing ACF, a PTFE and carbon powder. In the sheet, ACF 1, and carbon powder 2 are bound together with PTFE fibrils 3. In FIG. 5, further development of PTFE fibrils and denser binding of ACF via carbon articles is seen as compared to the adsorption sheet containing only ACF and a PTFE as shown in FIG. 4. It is also seen that the adsorption sheet of the present invention shown in FIG. 5 satisfactorily retains porosity by appropialety limiting the amount of carbon powder.

Figure 6:
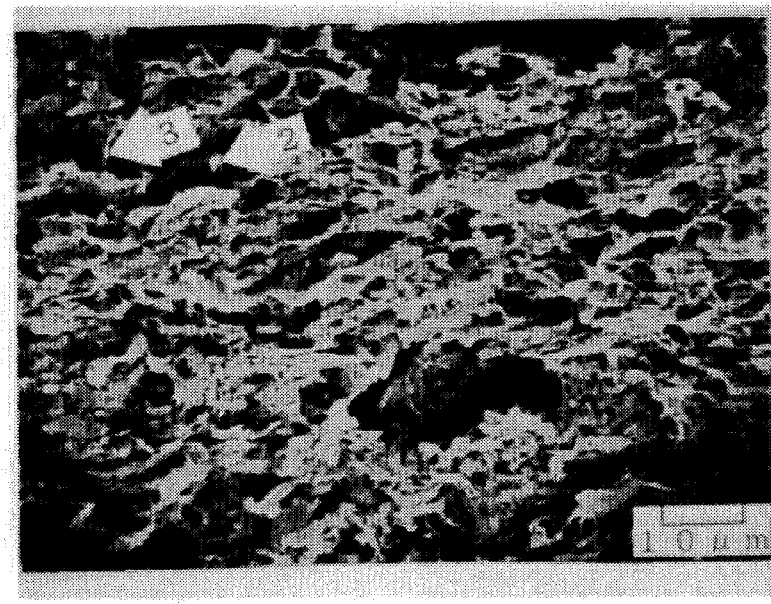
FIG. 6 is a SEM photograph of the cross section of a conventional adsorption sheet comprising powdered activated carbon and PTFE fibrils.

For comparison, an SEM photograph of the cross section of a conventional adsorption sheet comprising powdered activated carbon and PTFE fibrils is shown in FIG. 6. FIG. 6 shows that use of carbon powder alone results in structure in which carbon powder is densely packed. The resulting sheet has inferior porosity and lower gas permeability than the sheet containing ACF and carbon powder as shown in FIG. 5.

A preferred amount of carbon powder in the adsorption material is from 5 to 50 wt % more preferably from 10 to 40 wt %, and most preferably from 15 to 30 wt % based on the total weight of ACF and carbon powder. When the ratio is within this range, tensile elongation of the resulting adsorption sheet can be controled to from 20 to 60%. If the amount of carbon powder is less than 5% by weight, a sufficient effect of improving elongation cannot be obtained. If the carbon powder exceeds 50% by weight, high elongation can not be obtained, porosity tends to decrease, the packing density exceeds 1 g/cm$^3$, and pressure drop becomes high. A suitable amount of fibrillating PTFE (based on the total weight of the adsorption material) to be added is the same as described hereinabove for the adsorption material containing no carbon powder.

The adsorption material containing ACF and carbon powder can be prepared in the same manner as the adsorption material described hereinbefore.

Mixing of ACF, carbon powder and a PTFE can be conducted in any order, however, ACF and carbon powder are preferably mixed first.

The packing density of the adsorption sheet as a final product can be adjusted by changing the fiber diameter and length distribution of ACF, the particle size and amount of carbon powder, and conditions of shear application and rolling. These conditions can be easily determined by carrying out experiments within the range of conditions described herein. An adsorption material containing carbon particles having an increased tensil elongation can be obtained while retaining the aforesaid high tensile strength, proper packing density, and adsorption properties. Furthermore, since the tensile elongation of the adsorption material containing carbon powder has a high elongation, that is high plasticity, the product can easily be shaped into a sheet by rolling.

Since the adsorption sheet obtained by using carbon powder in the adsorption material of the present invention has a high elongation, even complicatedly shaped articles can be made so as to intimately contact with the surface of equipment. Furthermore, the freedom in fitting increased. Additionally, since the adsorption sheet has a higher elongation it is not broken when bent to 90° or more. Thus, the desired shape can be obtained by bending like paper.

As mentioned above, the adsorption sheet according to the present invention has excellent productivity and handling properties, achieving high strength and high elongation not heretofore attained high adsorptivity and gas permeability.

The adsorption material of the present invention can also be molded into forms other than a sheet. The material may be hot-pressed in e mold into a shaped article. The temperature for the hot-press is preferably from 80° to 320° C., more preferably from 60° to 200° C. In this case, the material may be fed to a mold by means of an extruder, or by laminating plural sheets punched out of sheeting. The material may be fed in the form of pellet. The material may be molded into any shape, such as tablets, honeycomb structures or cylinders. It is also possible to obtain string, piping, tape, etc. by using an extruder. A material may be shaped into fibrous material and may be further entangled together to be shaped like a ball of fluff.

Because the surface of ACF is substantially uncovered, a high level of adsorption activity is maintained. Because it is porous, the adsorption material of this invention has good permeability to gas and liquid and high adsorptivity within a small of the material volume. The adsorption material also has a smooth surface. The adsorption material of the present invention has excellent processability, and is easily formed into a thin film or a very small piece. The shaped articles are soft and tightly fit into a housing. Adsorbents obtained from the adsorption material of the present invention are excellent in heat resistance and chemical resistance. Furthermore, an adsorbent obtained by using the molding material of the present invention hardly suffers from fall-off of ACF or production of black dust, and is a comfortable to be touch.

Accordingly, the absorption material of the present invention is advantageous for use in electronic equipment requiring high performance and reduced size. The adsorption element is useful as an adsorbent for protecting an electrical circuit, by placing the adsorbent inside electrical equipment to adsorb and block outside corrosive components. Such an adsorbent can be used with safety because black dust is not generated (the electically conductive dust may adhere to an electrical circuit to cause a short-circuit).

The adsorption sheet obtained from the adsorption material of the present invention may be covered with a membrane filter preferably having a pore size of not greater than 3 μm.

The adsorption material of the present invention, especially in the form of a sheet, may be covered with a element particularly suitable for use in electrical equipment. Because the activated carbon fibers are intimately boundtogether with PTFE fibrils, the adsorption sheet hardly produces dust or releases fibers and is therefore suitable as an adsorbing element for housing in electrical equipment. Accordingly, the labor for sealing of an element are for process control can be reduced.

Pollutants which can be removed by the adsorption material of the present invention mainly include corrosive gases in air, such as $SO_x$, $NO_x$, hydrogen sulfide, and ammonia and, in addition, inorganic acidic gas, such as chlorine gas, organic acids such as carboxylic acids, hydrocarbons, and ozone. Other substances which can be removed by adsorption or decomposition with general activated carbon can also be removed.

Figure 7:
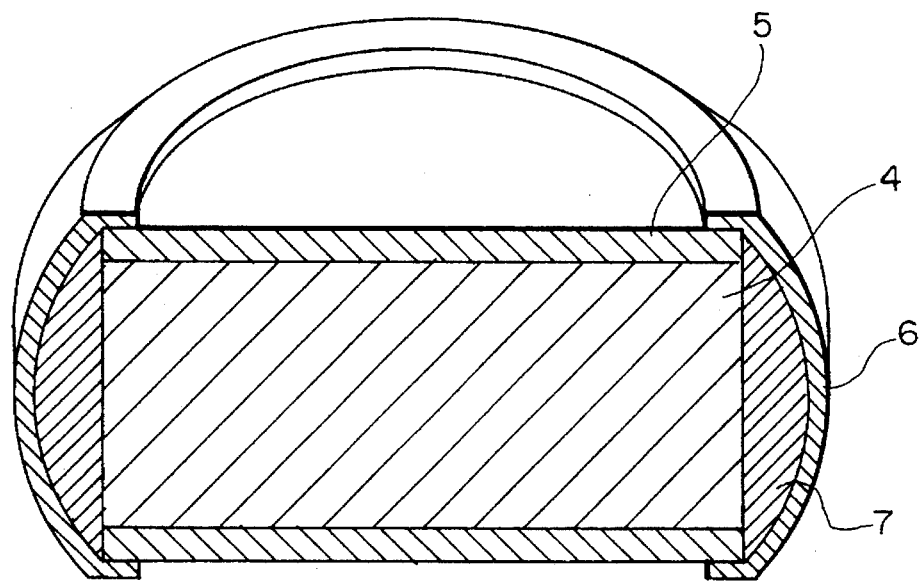
FIGS. 7, 8 and 9 show adsorbing elements for electrical equipment.
Figure 8:
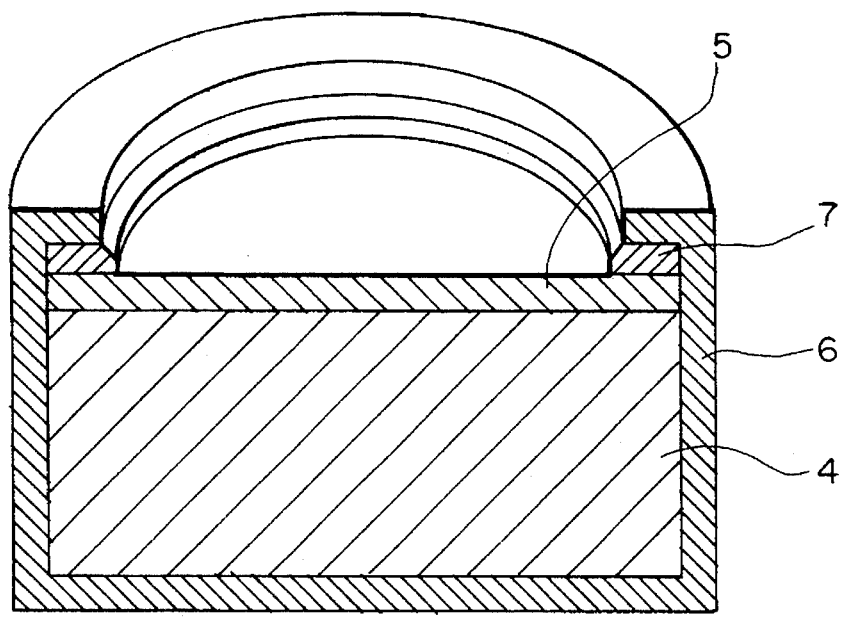
Figure 9:
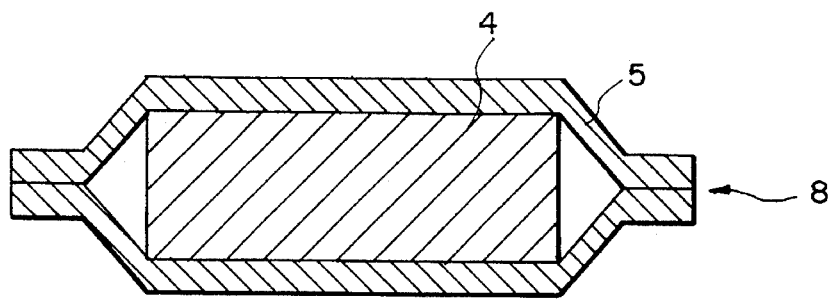
Figure 10:
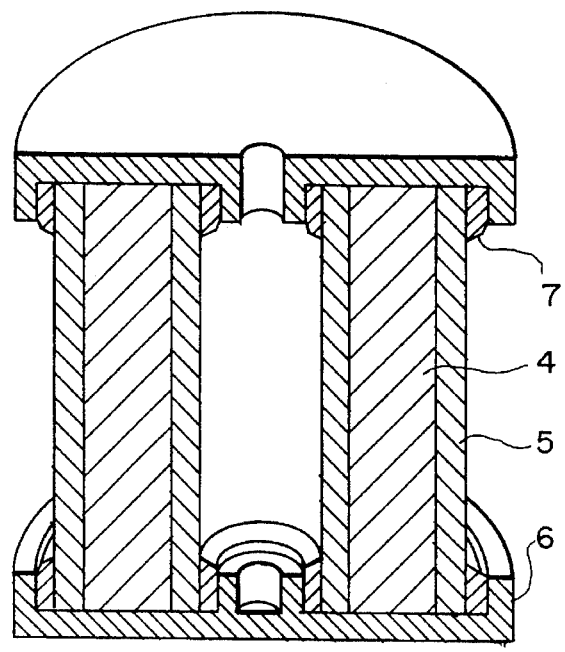
FIG. 10 shows a cylindrical adsorbing element for electrical equipment.

Specific examples of the adsorbing element for an electrical equipment according to the present invention are shown in FIGS. 7, 8, and 9. FIG. 10 is an example of a cylindrical adsorbing element for placing inside electrical equipment. Each of these adsorbing elements for placing inside electrical equipment is prepared by adhering porous filter membrane 5 onto one or both sides of adsorption sheet 4 by pressing, followed by punching to obtain a disk. Punching of adsorption sheet 4 may be followed by adhesion of filter membrane 5. Adsorption sheet 4 thus sealed with filter membrane 5 is then fitted into case 6.

It is preferable to sea the periphery of adsorption sheet 4 by bringing it into intimate contact with the case by means of an adhesive or gasket 7. Sealing may also be effected simply by applying an adhesive, adhering using double-coated adhesive tape, fusing a resin ring, or welding upper and lower filters membrane 5 adhered on both sides of adsorption sheet 4 as shown by 8 in FIG. 9.

The pore size of filter membrane 5 which can be used in each adsorbing element is preferably not greater than the fiber diameter of activated carbon fiber. In this manner, the activated carbon fiber of adsorption sheet 4, even if it falls off, may not pass therethrough. To this end, the pore size is preferably not greater than 3 μm. Materials for filter membrane 5 preferably include cellulose, nitrocellulose, cellulose acetate, polystyrene, polyethylene, acrylonitrile and PTFE. These materials are suitable for providing a filter membrane having uniform pores of 3 μm or smaller. In particular, PTFE is preferred for its fineness and uniformity of pores, high mechanical strength, and high chemical resistance.

EXAMPLES

Various characteristics described in the following Examples of the present invention were measured according to the methods described below.

In the present invention the length distribution of milled ACF is measured by using a method for measuring the distribution of the particle size by a light-scattering method using a laser light. The size distribution of ACF based on the mass or volume is obtained assuming the shape of the ACF particles (milled ACF) as a sphere. Since ACF particles have a definite density, the distribution patterns are the same independent of whether the measurments are conducted based on mass or volume.

The measurement is conducted by uniformly dispersing milled ACF into an aqueous solution of 0.1 wt % sodium hexametaphosphate while preventing orientation of ACF in water.

The size measured as described above is an average of the diameters and the actual lengths of ACF. Therefore, the actual length distribution of ACF is present at a longer length range than the value obtained by this measurment feature as seen in the SEM photographs of FIG. 2.

Since it is impossible to determine the actual length distribution of milled ACF accurately, the length in the present invention is measured by the above-described technique which is most widely used in this field for the determination of particle size distribution. Many apparatuses preferably used for measurement of particle size are commercially avairable, and the average size of milled ACF can be obtained in good repeatability using such an apparatus.

In the present invention, a model LA-500 laser diffraction-scattering measurment apparatus available from Horiba Co., Ltd. was used to measure the length of milled ACF.

The size distribution of ACF having 0.1 to 200 μm was obtained, and then the rate of the amount of ACF having a ratio L/D≧3 to the total amount of ACF was calculated.

The length of ACF contained in an adsorption sheet obtained from an adsorption material was measured after removing PTFE from the sheet by heating the sheet at 600° to 800° C. for one hour in a nitrogen atmosphere to decompose PTFE.

The average lengths of ACF used as a starting material in Examples were determined visually using a microscope.

The amounts of the ACF having a ratio of L/D≧3 in the ACF used as a starting material were at least 60 wt % (measured by the light scattering method described above).

The diameter of ACF can be controlled by selecting the diameter of a starting material such as polyacrylonitrile fiber for production of ACF. The average diameter is uniform in ACF and it can be measured from a SEM photograph of a cross section of ACF.

Tensile Strength

An adsorption sheet was cut into a 2.5 cm wide and 10 cm long strip. Tensile strength of the strip was measured with a tensile tester (TENSILON-UTM III, manufactured by Toyo Sokuki Co., Ltd.) at a pulling speed of 3 cm/min.

The strength (g) was divided by the cross area of the sheet to obtain a tensile strength (g/mm$^2$). The tensile elongation was represented by percentage of the elongated maximum length at which the sheet is broken based on the original length of the sheet. These teste were conducted in the same direction as the rolling direction and at a direction at right angle thereto.

The largest value of the mechanical strength obtained by measuring with respect to various directions is selected and shown in Examples.

Specific Surface Area

Specific surface area was measured in accordance to a BET equation based on nitrogen adsorption.

Toluene Saturation Adsorption

This parameter was measured in accordance with the activated carbon test method of JIS K-1474. Toluene concentration: 1/10 saturation; weight of specimen: 2,5 g; measuring temperature: 25° C.

Saturated Water Content

An adsorption sheet was left to stand in a desiccator kept at 25° C. and 80% RH, and the water content was measured. The water content in the material is shown based on the total weight of the material dried at 120° C. for 2 hours.

Pressure Drop

A disc having a diameter of 25 mm and thickness of 0.2 mm was punched out from an adsorption sheet and put in a filter holder. Dry air was passed therethrough at a flow rate of 0.2 lit/min (except in Example 9 wherein it was 20 ml/min.) to measure the pressure drop.

In the present invention and Examples (except Example 11) the direction of the application of compressive shear stress were at random, and the press rolling was conducted in one direction in Examples.

Example 1

Finegard FC300 (PAN type ACF produced by Toho Rayon Co., Ltd.; average fiber diameter: 8 m; specific surface area: 890 m$^2$/g) was ground to form milled fiber having an average fiber length of 150 μm by means of a Henschel mixer(a mixer having rotating blades). In a container was placed 95 parts by weight of the milled fiber, and 300 parts by weight of water was added to make a slurry. To the slurry was added 5 part by weight, in terms of PTFE, of Teflon K20-J (30 wt % PTFE aqueous suspension produced by Du Pont-Mitsui Fluorochemicals Co., Ltd.; average particle size: 0.2 μm), followed by stirring well at room temperature.

The resulting mixture was dried at 120° C. to reduce the water content to less than 10 wt %. The dried mixture was passed through a biaxial roll mill having a roll diameter of 30 cm kept at 120° C. to apply a shear stress. The rotation number of each roller was 14 rpm and 28 rpm, respectively, and the nip of rollers was 0.1 mm (12.5 times the diameter of ACF). After passing through the roll mill the mixture became a flaky material. The material was passed through the roll mill seven times to obtain a sheet.

The resulting material was rolled with an even speed (1 rpm) roll having a roll diameter of 30 cm and a nip of 0.5 mm, and kept at 120° C. to obtain a sheet having a thickness of about 1 mm. The sheet was further passed through the roll repeatedly to obtain a sheet having a thickness of 0.2 mm by narrowing the nip gradually from 0.5 to 0.1 mm.

The thus obtained adsorption material contained 5 wt % of PTFE and the amount of ACF having a ratio L/D≧3 was 41 wt %.

The adsorption sheet thus was evaluated as described above, the results of which are set forth in Table 1 below.

TABLE 1

| Characteristics | Adsorption Sheet | ACF* |
|---|---|---|
| Specific surface area (m$^2$/g) | 840 | 890 |
| Toluene adsorption (wt %) | 30 | 32 |
| Saturated water adsorption (wt %) | 32 | 36 |
| Tensile strength (g/mm$^2$) | 20 | — |
| Tensile elongation (%) | 60 | |
| Pressure drop (mmH$_2$O) | 95 | — |
| Packing density (g/cm$^3$) | 0.70 | — |

Note *Measured value of ACF used as a raw material.

It is seen from Table 1 that the adsorption sheet made of the material of Example 1 manifests adsorptivity extremely close to that of ACF used as a raw material. The thickness of the sheet could be reduced to 0.05 mm by continuing the roll pressing because the sheet had a high tensile strength and a high tensile elongation.

FIG. 2 is a SEM photograph of the surface of the adsorption sheet obtained in Example 1, and FIG. 3 is a SEM photograph of the cross section of the adsorption sheet.

EXAMPLE 2

Example 2 relates to an adsorption sheet prepared from a adsorption material comprising ACF and a varied proportion of PTFE.

Various adsorption sheets were prepared using the procedure of Example 1, and the sheet characteristics were evaluated as described above. The results obtained are shown in Table 2 below.

TABLE 2

| Run No. | PTPE Content (wt %) | Specific Surface Area(m$^2$/g) Sheet | ACF | Tensile Strength (g/mm$^2$) | Tensile Elongation (%) | Packing Density (g/cm$^3$) | Pressure Drop (mmH$_2$O) | L/D (wt %) |
|---|---|---|---|---|---|---|---|---|
| 1 | 0.5 | 880 | 880 | 1 | 5 | 0.35 | 10 | 31 |
| 2 | 1.0 | 880 | 890 | 4 | 10 | 0.50 | 30 | 35 |
| 3 | 2.0 | 860 | 880 | 10 | 60 | 0.65 | 70 | 41 |
| 4 | 5.0 | 840 | 880 | 20 | 60 | 0.70 | 95 | 45 |
| 5 | 10.0 | 780 | 870 | 80 | 65 | 0.75 | 200 | 47 |
| 6 | 20.0 | 680 | 850 | 300 | 67 | 0.85 | 480 | 48 |
| 7 | 50.0 | 430 | 860 | 1200 | 65 | 0.95 | more than 500 | 50 |
| 8 | ACF used | — | 890 | — | — | — | — | — |

TABLE 2-continued

| Run No. | PTPE Content (wt %) | Specific Surface Area(m²/g) Sheet | Specific Surface Area(m²/g) ACF | Tensile Strength (g/mm²) | Tensile Elongation (%) | Packing Density (g/cm³) | Pressure Drop (mmH₂O) | L/D (wt %) |
|---|---|---|---|---|---|---|---|---|
| | as a raw material | | | | | | | |

It is seen from Table 2 that the adsorption sheet of the present invention exhibits excellent properties. The adsorptivity of the adsorption sheet decreases as the PTFE content increases. This is because the ACF content relatively decreases. Therefore adsorptivity is converted to a value per 100% ACF content, it is seen that the reduction in performance as ACF is slight in every case. Thus, the adsorption sheet of the present invention retains a satisfactory level of ACF activity even if the PTFE content is increased. This indicates that the added PTFE does not cover the surface of ACF. Consequently, there is virtually no change in adsorptivity of ACF, as explained above with reference to FIG. 1, the SEM photograph of the adsorption material of the present invention.

Furthermore, the adsorption sheet had excellent handling properties, and generated a very small amount of black dust.

EXAMPLE 3

This experiment was conducted in order to show adsorption performance of the adsorption sheet of the present invention in a liquid phase.

Finegard FC510 (PAN type ACF produced by Toho Rayon Co., Ltd.; average fiber diameter: 5 m; specific surface area 1400 m²/g) was ground to form milled fiber having an average fiber length of 150 μm by means of a Henschel mixer. Two sheets having a PTFE content of 2 wt %, a thickness of 0.2 mm and 0.4 mm were obtained in the same manner as in Example 1.

A disk having a diameter of 2.5 cm punched out from the sheet having a thickness of 0.4 mm was placed in a filter holder. 100 ml of a 300 ppm methylene blue solution (pH was adjusted to 7 using a phosphoric acid buffer solution) was passed through the sheet at a speed of 1 ml/min. The adsorption amount of the methylene blue was obtained by measuring the concentration of the solution before and after passing through the sheet. The adsorption amount of vitamine B12 (cyanocobalamine) was also measured in the same manner as methylene blue.

For comparison, the same tests as described above were conducted using Fine Guard FC510 packed in a column.

The results thus obtained and other characteristics of these absorbents are shown in Table 3.

TABLE 3

| Characteristics | Adsorbent Sheet | Adsorbent Raw ACF |
|---|---|---|
| Specific Surface Area (m²/g) | 1300 | 1400 |
| Adsorption Amount of Methylene Blue | 130 | 190 |
| Adsorption Amount of Vitamine B12 | 140 | 220 |
| Tensile Strength (g/mm²) | 20 | — |
| Tensile Elongation (%) | 60 | — |
| Packing Density (g/cm³) | 0.50 | — |
| Pressure Drop (mmH₂O) | 450 | — |

TABLE 3-continued

| Characteristics | Adsorbent Sheet | Adsorbent Raw ACF |
|---|---|---|
| Amount of ACF of L/D ≧ 3 (wt %) | 48 | — |
| Remarks | Invention | Comparison |

From the results shown in Table 3, it is seen that the adsorption sheet of the present invention has excellent performance in a liquid phase.

EXAMPLE 4

Finegard FC400 (PAN type ACF produced by Toho Rayon Co., Ltd.; average fiber diameter: 7 μm; specific surface area: 1000 m²/g) was ground to form milled fiber having an average fiber length of 0.1 mm by means of a Henschel mixer (a mixer having rotating blades). In a container was placed 80 parts by weight of the milled fiber, and 300 parts by weight of water was added to make a paste. To the paste was added 20 part by weight, in terms of PTFE, of Teflon K20-J (30 wt % PTFE aqueous suspension produced by Du Pont-Mitsui Fluorochemicals Co., Ltd.; average particle size: 0.2 m), followed by stirring well at room temperature.

The resulting mixture was dried at 120° C. until the water content in the mixture was reduced to less than 10 wt %. The dried mixture was passed through a biaxial roll mill having a diameter of 30 cm kept at 120° C. to apply a shear stress. The rotation number of each roller was 14 rpm and 28 rpm, respectively, and the nip was 0.1 mm. The mixture was passed through these rollers seven times to obtain a sheet-like flaky material.

The resulting flaky material was collected and rolled with a pair of rollers (having a diameter of 30 cm and each rotating at 1 rpm) kept at 120° C. into a sheet having a thickness of about 1 mm. The obtained sheet was further rolled at 120° C. using rollers rotating at the same speed to obtain a sheet having a thickness of 0.3 mm. This sheet contained 20 wt % of PTFE and had a packing density of 0.85 g/cm³.

Figure 11:
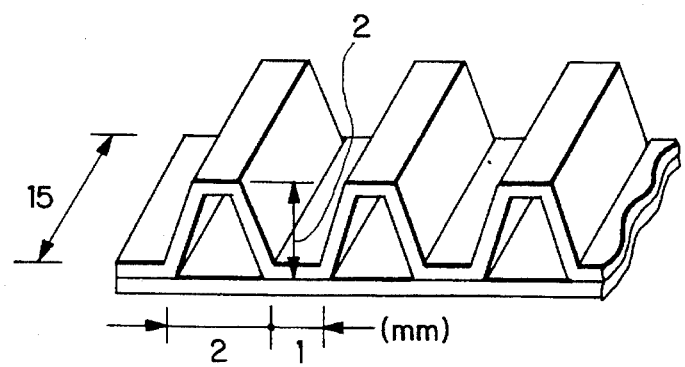
FIG. 11 shows an adsorbent having a honeycomb structure.

Two sheets each having 15 mm width were cut out from the thus obtained sheet. To one of them was applied pleats. The processed sheet and the other sheet were adhered by pressing at 120° C. to obtain a honycomb adsorbent as shown in FIG. 11.

1.5 g of honycomb sheet was wind up spirally and packed into a stainless steal column having an inside diameter of 22 mm.

A gas containing SO₂ which is a typical air polluting material was passed through the column at a speed of 1 l/min in a direction parallel with the direction of honeycomb (the length of the sheet in this direction was 15 mm). The pressure loss was not more than 10 mm $H_2O$. The gas was air containing 50 ppm of $SO_2$ (RH 50%, 25° C.). The $SO_2$ concentration was continuously measured using an automatic infrared analyzer. The $SO_2$ concentration at the exit of the column immediately after beginning the test was 0 ppm. This is due to the rapid adsorption speed characteristic to ACF. Ten hours after the beginning the test, $S_2$ started to leak through. The adsorption amount until the start of leakage was 5.7 wt % based on the weight of the adsorption sheet. This value is higher than that of an adsorption sheet made from conventional activated carbon powder instead of ACF.

EXAMPLE 5

Finegard FC 410 (acrylic type activated carbon fiber produced by Toho Rayon Co., Ltd.; average fiber diameter: 6 μm; specific surface area: 1100 $m^2/g$) was ground to milled fiber having an average fiber length of 0,2 mm by means of a Henschel mixer. Using this milled ACF, Sheet A was obtained in the same manner and apparatus as in Example 1.

Subsequently, Adsorption Sheets B, C, D, and E having different PTFE contents were obtained in the same manner as Adsorption Sheet A, except for changing the PTFE content.

Adsorption Sheet F having a PTFE content of 5% by weight was obtained in the same manner as Adsorption Sheet A, except for using Tokusen Shirasagi (powdered activated carbon produced by Takeda Chemical Industries, Ltd.; specific surface area: 1000 $m^2/g$) having an average particle size of 10 μm.

For comparison, fabric of Finegard , FW410 (produced by Toho Rayon Co., Ltd.; average fiber diameter: 6 μm; specific surface area: 1100 $m^2/g$) was prepared. Characteristics of the resulting Sheets A to F and fabric (FW410) are shown in Table 4.

metric efficiency. Tensile strength of these sheets reached a practically useful level at a PTFE content of 2% by weight and becomes equal or superior to the comparative fabric (FW410) at a PTFE content of 5% by weight or more.

With respect to pressure drop, the Adsorption Sheets A to E of the present invention each were acceptable, whereas the comparative Adsorption Sheet F using powdered activated carbon resulted a markedly higher pressure drop and was unsuitable for practical use.

EXAMPLE 6

Disks having a diameter of 25 mm were punched out from each of the Adsorption Sheet A, C and D prepared in Example 5 and the fabric (FW410), and these disks were fitted into a filter case. Air containing 50 ppm by volume of sulfurous acid gas ($SO_2$) and having a relative humidity of 50% was passed through the disk adsorbent. The length of time required for $SO_2$ to begin to leak was measured, and the $SO_2$ adsorption of the disk until $SO_2$ began to leak was measured. In the same manner, nitrogen monoxide (NC) adsorption, hydrogen sulfide ($H_2S$) adsorption and ammonia ($NH_3$) adsorption were measured. Furthermore, a saturation adsorption in toluene having a ⅒ saturation was measured in accordance with JIS-K-1474. The results obtained are shown in Table 5.

TABLE 4

| Form of Adsorbent | Sample | Ratio of PTFE Added (wt %) | L/D ≧ 3 (wt %) | Thickness (mm) | Packing Density (g/cm³) | Pressure Drop (mmH₂O) | Tensile Strength (g) | Remark |
|---|---|---|---|---|---|---|---|---|
| Activated Carbon Fiber Fabric | FW410 | — | — | 2.0 | 0.2 | 10 or less | 200 | Comparison |
| Adsorption Sheet: Using activated carbon fiber | B | 1 | 33 | 0.2 | 0.4 | 27 | 21 | Invention |
|  | C | 2 | 44 | 0.2 | 0.5 | 70 | 60 | Invention |
|  | A | 5 | 45 | 0.2 | 0.6 | 95 | 200 | Invention |
|  | D | 10 | 48 | 0.2 | 0.7 | 210 | 500 | Invention |
|  | E | 20 | 48 | 0.2 | 0.7 | 360 | 950 | Invention |
| Using powdered activated carbon | F | 5 | — | 0.2 | 1.1 | more than 500 | 92 | Comparison |

As shown in Table 4, Adsorption Sheets A to E of the present invention each had a higher packing density than that of comparative fabric (FW410), indicating a high volu-

TABLE 5

| Sample | Ratio of PTFE Added (wt %) | Specific Surface Area (m²/g) | SO₂ Adsorption (mg/g) | NO Adsorption (mg/g) | H₂S Adsorption (mg/g) | NH₃ Adsorption (mg/g) | Toluene Saturation Adsorption (%) | Remark |
|---|---|---|---|---|---|---|---|---|
| FW410 | — | 1100 | 25 | 0.50 | 85 | 1.5 | 39 | Comparison |
| C | 2 | 920 | 21 | 0.48 | 81 | 1.3 | 33 | Invention |
| A | 5 | 850 | 18 | 0.42 | 79 | 1.2 | 31 | Invention |

TABLE 5-continued

| Sample | Ratio of PTFE Added (wt %) | Specific Surface Area (m²/g) | SO₂ Adsorption (mg/g) | NO Adsorption (mg/g) | H₂S Adsorption (mg/g) | NH₃ Adsorption (mg/g) | Toluene Saturation Adsorption (%) | Remark |
|---|---|---|---|---|---|---|---|---|
| D | 10 | 760 | 15 | 0.35 | 73 | 1.1 | 27 | Invention |

Table 5 shows that the Adsorption Sheets A, C and D of the present invention exhibited high adsorption for corrosive substances, such as $SO_2$, NO, $H_2S$, and $HN_3$, and organic solvents, such as toluene, to thereby prove excellent performance to removing various pollutants from the air. When compared with fabric made of activated carbon fiber (FW410), any of the adsorption sheets of the present invention was shown to maintain satisfactory adsorptivity.

EXAMPLE 7

A disk having a diameter of 25 mm was punched out from each of Adsorption Sheets A to E prepared in Example 6 and the fabric (FW410). Thirty disks per sample were stirred in water containing 0.01% by weight of sodium alkyldodecylbenzenesulfonate as a surfactant for 30 minutes at 100 rpm. After stirring, the aqueous solution was evaporated to dryness, and the amount of the released activated carbon fiber (the amount of black dust produced) was measured (no membrane filter).

Then, a disk having a diameter of 25 mm was punched out from each of the Adsorption Sheets A to E prepared in Example 6 and the fabric (FW410). The disk was sandwiched between a pair of PTFE-made membrane filters (produced by Toyo Roshi Co., Ltd.), and the periphery of the disk was sealed by fusing with a thermoplastic resin ring to obtain an adsorption element. Two kinds of membrane filters, one having a pore size of 0.2 μm and the other 1 μm, were used above to prepare two kinds of adsorption elements per sample. Furthermore, an adsorption element was prepared by using nitrocellulose-made membrane filters having a pore size of 3 μm (produced by Toyo Roshi Co., Ltd.) or polyester-cellulose acetate-made membrane filters having a pore size of 10 μm (produced by Toyo Roshi Co., Ltd.).

Thirty adsorption elements thus obtained per sample were stirred in water containing 0.01% by weight of a sodium alkyldodecylbenzenesulfonate as a surfactant for 30 minutes. After stirring, the aqueous solution was evaporated to dryness, and the amount of the released activated carbon fiber (the amount of black dust produced) was measured. The results obtained are shown in Table 6 below.

As shown in Table 6, the adsorption sheets of the present invention, having a tensile strength of not less than 5 g/mm²-sectional area and a PTFE content of not less than 2% by weight, generated a reduced amount of black dust and were easy to handle even without a membrane filter. Thus the adsorption material of the present invention is advantageously used in electrical equipment. It is also seen that the adsorption elements prepared by using a mambrane filter having a pore size of 3 μm or smaller are substantially dust-free and are also suitable for use in electrical equipment.

EXAMPLE 8

Each of the adsorption elements obtained in Example 7 (prepared from Sample A) and the fabric (FW410) was allowed to stand in a 4 l-volume airtight bag containing air having an $SO_2$ concentration of 50 ppm and a relative humidity of 50%. The length of time required for the $SO_2$ concentration to be reduced to 5 ppm or less was measured. The results obtained are shown in Table 7 below.

TABLE 6

| Sample | Ratio of PTFE Added (wt %) | Amount of Black Dust Produced (mg/g) | | | | | Sheet Tensile Strength (g/mm²) | Remark |
|---|---|---|---|---|---|---|---|---|
| | | Without Membrane Filter | Pore Size of Membrane Filter | | | | | |
| | | | 0.2 μm | 1 μm | 3 μm | 10 μm | | |
| FW410 | — | 3.9 | ≦0.1 | 0.2 | 0.4 | 1.5 | — | Comparison |
| B | 1 | 3.5 | ≦0.1 | 0.2 | 0.4 | 1.6 | 4.2 | Invention |
| C | 2 | 0.9 | ≦0.1 | ≦0.1 | ≦0.1 | 0.5 | 12.0 | Invention |
| A | 5 | 0.5 | ≦0.1 | ≦0.1 | ≦0.1 | 0.2 | 40.0 | Invention |
| D | 10 | 0.3 | ≦0.1 | ≦0.1 | ≦0.1 | ≦0.1 | 100.0 | Invention |
| E | 20 | 0.3 | ≦0.1 | ≦0.1 | ≦0.1 | ≦0.1 | 190.0 | Invention |

TABLE 7

| Sample | Ratio of PTFE Added (wt %) | Specific Surface Area (m²/g) | Adsorbent Form | Adsorbent Diameter (mm) | Adsorbent Thickness (mm) | Packing Density (g/cm³) | Pore Size of PTFE Membrane Filter (μm) | Requisite Time for SO₂ Removal (hr) | Remark |
| --- | --- | --- | --- | --- | --- | --- | --- | --- | --- |
| FW410 | — | 1100 | fabric | 25 | 2.0 | 0.2 | 0.2 | 1.0 | Comparison |
| A | 5 | 850 | sheet | 25 | 0.2 | 0.6 | 0.2 | 1.1 | Invention |

As shown in Table 7, the adsorption element using the adsorption sheet of the present invention is capable of adsorbing and removing $SO_2$ as rapidly as a comparative fabric adsorbent comprising activated carbon fiber (FW410) and also has a smaller size (only 1/10 time the thickness of the fabric adsorbent).

EXAMPLE 9

Example 9 relates to adsorption sheets produced by varying the amount of carbon powder.

Finegard FC410 (acrylic type activated carbon fiber produced by Toho Rayon Co., Ltd.; average fiber diameter: 6 μm; specific surface area: 1100 m²/g) having been ground to milled fiber having an average fiber length of 0.2 mm by means of a Henschel mixer was used as ACF. Shirasagi RM (powdered activated carbon produced by Takeda Chemical Industries, Ltd.; specific surface area: 1000 m²/g) having been ground in a ball mill to regulate its average particle size to 4 μm was used as a carbon powder. Teflon K20-J (aqueous dispersion produced by Du Pont-Mitsui Fluorochemicals Co., Ltd.; average particle size: 0.2 μm) was used as a fibrillating PTFE.

A weight amount of ACF (milled fiber of FC410), a weight amount of carbon powder (powder of Shirasagi RM), and mixtures of ACF and carbon powder at various mixing ratios were prepared as raw materials.

To 95 parts by weight of each raw material were added 200 parts of water an 5 parts, in terms of PTFE, of Teflon K20-J, followed by completely mixing to prepare a slurry at room temperature. The slurry was spread over a stainless steel vat and dried at 120° C. to a water content of 10% by weight.

The dried mixture was fed to a roll mill heated at 120° C. to apply a shear stress. The roll mill comprised two rolls. The rotation number of one of the rolls was 25 rpm, and that of the other roll was 50 rpm. The roll nip was 0.1 mm. The mixture became a flaky material after passing through the roll mill. The flaky material was passed through the roll mill 5 times until the surface became smooth, to thereby to accelerate fibrillation of PTFE.

The resulting flakes of material were gathered in piles and passed through a pair of even speed rolls (5 rpm) heated at 120° C. to obtain 1 mm thick sheeting for an adsorption sheet. The sheet was rolled out to a small thickness by successively passing through a plurality of pairs of even speed rolls under heat at 120° C. with the roll nip stepwise decreasing to finally obtain a 0.2 mm thick sheet having a PTFE content of 5% by weight. The resulting adsorbent sheet had a specific surface area ranging from 850 to 950 m²/g, indicating satisfactory retention of adsorptivity.

The tensile strength, elongation, pressure drops (flow rate of air was 20 ml/min.), and packing density of each adsorption sheet were measured to examine the relation to the mixing ratio of ACF and carbon powder. The results are shown in FIGS. 12 and 13.

Figure 12:
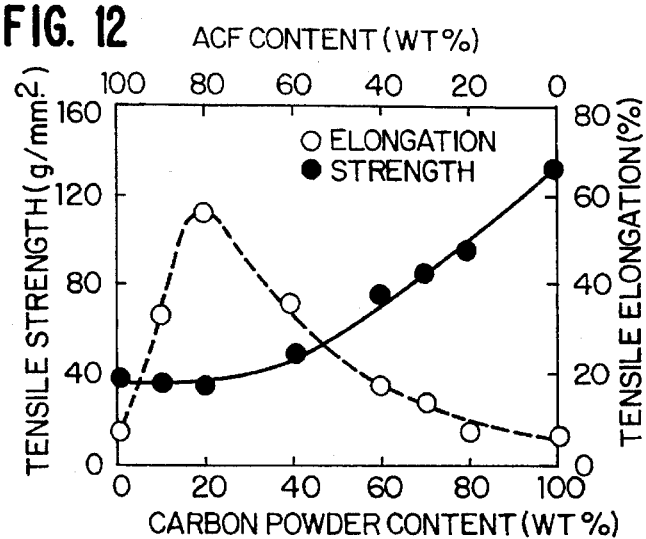
FIGS. 12 and 13 show the relationship between adsorption characteristics and the mixing ratio of ACF and carbon powder.

It is seen from FIG. 12 that the elongation reaches about 60%, the maximum, at 20% by weight of carbon powder. Furthermore, a high elongation of not less than 20% and a practically sufficient strength of not less than 5 g/mm² is obtained at 5 to 50% by weight of carbon powder as specified in the present invention. At a carbon powder content exceeding 50% by weight, the elongation tends to decrease.

Figure 13:
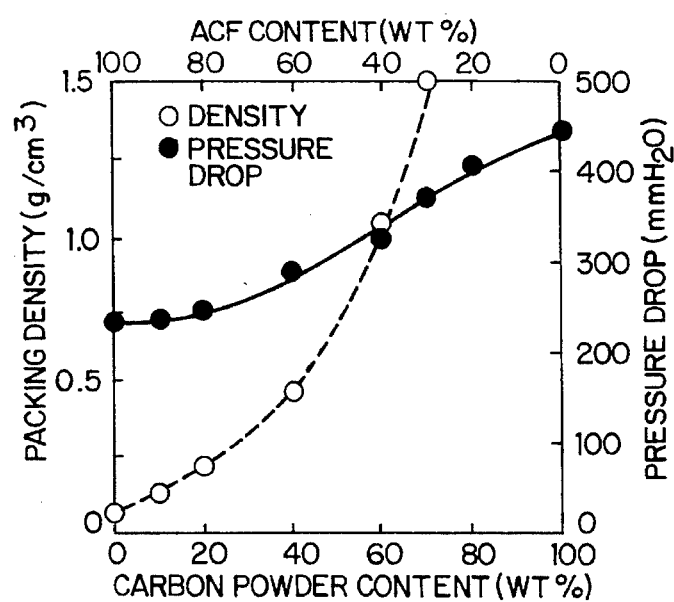

It is seen from FIG. 13 that as the packing density exceeds 1 g/cm³, the pressure drop steeply increases. Furthermore, the sheet is no longer suitable for practical use at a carbon powder content out of the range of from 5 to 50% by weight as specified in the present invention.

When the carbon powder content is within the range of from 5 to 50% by weight, a high elongation and a low pressure drop are obtained.

EXAMPLE 10

Example 10 relates to adsorption sheets prepared by varying the amount of PTFE based on the mixture of ACF and carbon powder.

In the same manner as in Example 9, a mixture of ACF (milled fiber of FC410) and 20% by weight of carbon powder (powder of Shirasagi RM) was prepared as a starting material.

Adsorption Sheets were prepared in the same manner as in Example 9, except for varying the amount of added PTFE. The strength and elongation of the resulting sheets were measured. The results obtained are shown in FIG. 14.

Figure 14:
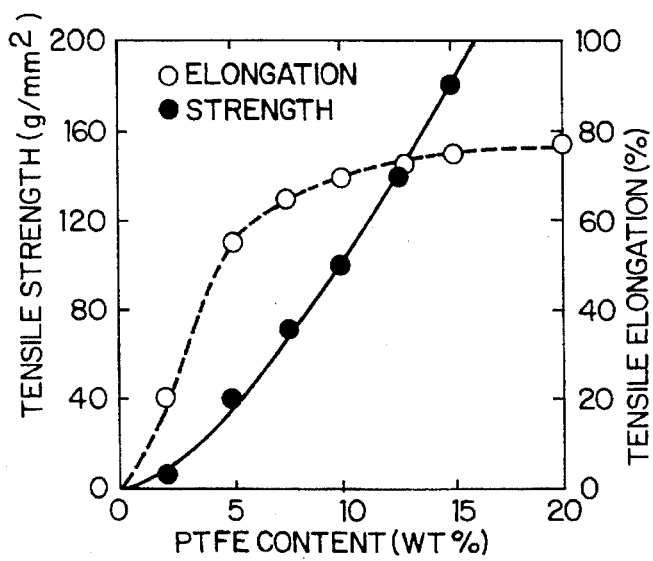
FIG. 14 shows the relationship between mechanical strength and PTFE content in adsorption sheets of the present invention.

It is seen from FIG. 14 that the adsorption sheet of the present invention containing 20% by weight of carbon powder based on total weight of ACF and carbon powder exhibited excellent characteristics of not less than 5 g/mm² in strength and not less than 20% in elongation in the presence of 2% by weight or more of PTFE.

EXAMPLE 11

Sheets G, H, I and J were obtained in the same manner as in Example 1, except that PTFE was used in the amounts shown in Table 8 and compressive shear stress was applied in one direction during all steps by passing the mixture through rollers in one direction.

Sheet K was obtained in the same manner as Sheet H, except that the press rolling was conducted in two directions alternately crossing a right angles to each other.

Figure 15:
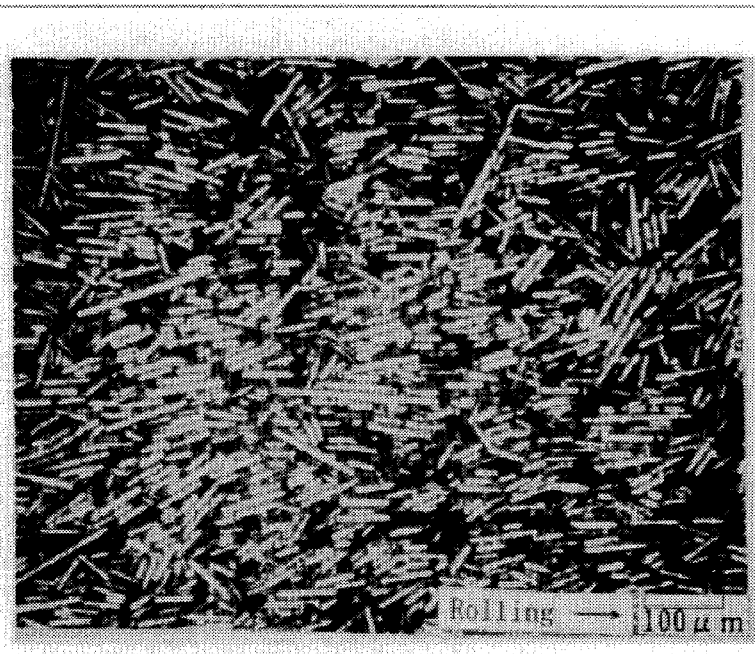
FIG. 15 is a microphotograph of an adsorption sheet of the present invention wherein ACF contained therein is oriented in approximately a single direction.

The ACF orientations of Sheets G, H, I and J are approximately unidirectional. A microphotograph of the surface of Sample H is shown in FIG. 15. By a visual measurement using a microphotograph of the surface of each sheet, the number of ACF having a direction within ±45° with respect to the direction of the press rolling was found to be 82%.

Figure 16:
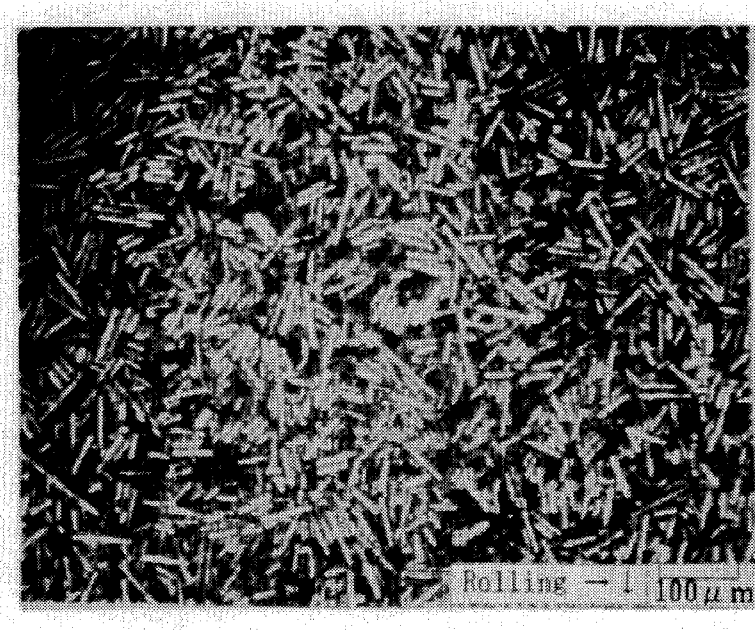
FIG. 16 is a microphotograph of an adsorption sheet of the present invention wherein ACF contained therein is oriented at random.

The ACF orientation of Sheet K was at random as shown in FIG. 16 which is a microphotograph of the surface of the sheet. According to the visual test described above, the number of ACF oriented to the direction within ±45° with respect to the direction of press rolling was about 60%.

Mechanical properties of the sheets thus prepared are shown in Table 8.

TABLE 8

| Sample | G | H | I | J | K |
|---|---|---|---|---|---|
| PTFE Content (wt %) | 2 | 5 | 10 | 20 | 5 |
| Rolling Directions | same direction | same direction | same direction | same direction | at an angle of 90° |
| Tensile Strength (g/mm²) | | | | | |
| Rolling Direction | 13 | 27 | 101 | 300 | 52 |
| At 90° to Rolling Direction | 4 | 9 | 25 | 80 | 59 |
| Tensile Elongation (%) | | | | | |
| Rolling Direction | 10 | 10 | 10 | 10 | 60 |
| At 90° to Rolling Direction | 68 | 58 | 53 | 67 | 40 |

As shown above, the adsorption material of the present invention has the following excellent characteristics.

(1) The sheet adsorbent of the present invention has a high tensile strength because it has a network structure in which fibers of ACF are intimately bound together with fibrils of PTFE. This effect is accelarated by addition of carbon powder.

The adsorption material of the present invention has high elongation and tight softness not heretofore attained. This characteristics can be more effectively obtained when carbon particles are used in the material. Therefore, when placed in a small container, the adsorption material of the present invention intimately contacts the container with large freedom in shaping and strength on deformation to provide an article having high performance not heretofore achieved.

(2) The adsorption material of the present invention, while soft, may be provided with a high strength of not less than 5 g/mm², which is sufficient for practical use.

(3) The adsorption material of the present invention retains high adsorptivity of ACF and exhibits high gas permeability due to fibrous ACF and is therefore advantageous for adsorption.

(4) The packing density of the adsorption material of the present invention can be controlled to from 0.4 to 1.0 g/cm³, which is higher than that of a conventional paper-like or felt-like molded article, while retaining high gas permeability and is therefore excellent in volumetric efficiency.

As mentioned above, the adsorption material of the present invention not only retains high adsorptivity and gas permeability but exhibits excellent volumetric efficiency because of a moderate density with a very small thickness. Accordingly, it is suitable as a very thin type adsorbent to be fixed inside electrical equipment, or as an electrode for an electrical double layer condenser, an electrode of batteries, such as lithium batteries, as it is, or as a keep-fresh material.

While the invention has been described in detail and with reference to specific embodiments thereof, it will be apparent to one skilled in the art that various changes and modifications can be made therein without departing from the spirit and scope thereof.

What is claimed is:

1. An adsorption material comprising milled activated carbon fiber bound together by fibrils of a polytetrafluoroethylene resin,
   wherein said adsorption material is produced by
      mixing the milled activated carbon fiber and fibrillating polytetrafluoroethylene resin particles, and then
      applying compressive shear stress to the mixture to fibrillate the polytetrafluoroethylene resin particles to thereby bind the activated carbon fiber by the polytetrafluoroethylene resin fibrils which are melt-adhered to the activated carbon fibers,
   wherein the average fiber diameter of said activated carbon fiber is from 2 to 50 µm,
   wherein the length of the activated carbon fiber is at least 10 µm, and
   wherein the content of activated carbon fibers, having a ratio of the length of the activated carbon fiber measured by a laser light scattering technique to the average diameter of the activated carbon fiber of not less than 3, is at least 20 wt % based on the total amount of activated carbon fiber contained in the adsorption material.

2. The adsorption material as in claim 1, wherein the amount of the polytetrafluoroethylene resin contained in the adsorption material is from 0.5 to 50 wt % based on the total weight of the adsorption material.

3. The adsorption material as in claim 1, wherein the adsorption material further comprises carbon powder having an average size that is not greater than the average fiber diameter of the activated carbon fiber.

4. The adsorption material as in claim 1, wherein the adsorption material further comprises carbon powder in an amount of from 5 to 50 wt % based on the total weight of the activated carbon fiber and the carbon powder.

5. The adsorption material as in claim 1, wherein the adsorption material is in a form of a sheet.

6. The adsorption material as in claim 1, wherein the adsorption material is in a form of a sheet having a tensile strength of at least 5 g/mm² and a tensile elongation of at least 10%.

7. The adsorption material as in claim 1, wherein the adsorption material has a packing density of from 0.3 to 1.0 g/cm³.

8. The adsorption material as in claim 1, wherein the activated carbon fiber in the adsorption material has a specific surface area of not less than 400 m²/g.

9. The adsorption material as in claim 1, wherein the adsorption material is in a form of a sheet and the activated carbon fiber contained in the sheet is randomly oriented.

10. The adsorption material as in claim 1, wherein the adsorption material is in a form of a sheet and the activated carbon fiber is mainly oriented in a single direction.

11. A method for production of an adsorption material, which comprises:
   mixing milled activated carbon fiber and a fibrillatable polytetrafluoroethylene resin, and then
   applying compressive shear stress to the mixture to fibrillate the polytetrafluoroethylene resin to bind the activated carbon fiber by the polytetrafluoroethylene resin fibrils by melt-adhering to the activated carbon fiber.

12. The method for production of an adsorption material as in claim 11, wherein compressive shear stress is applied to the mixture containing not more than 40 wt % of liquid.

13. The method for production of an adsorption material as in claim 11, wherein compressive shear stress is applied until a tensile strength of the adsorption material increases to at least 5 g/mm$^2$.

14. The method for production of an adsorption material as in claim 11, wherein compressive shear stress is applied using a roll mill comprising at least two rolls which rotate at different linear speeds.

15. The method for production of an adsorption material as in claim 11, wherein compressive shear stress is applied using a roll mill comprising at least two rolls which rotate at different linear speeds, and the adsorption material is then formed into a sheet using a press roll comprising at least two rollers which rotate at the same linear speed.

16. The method for production of an adsorption material as in claim 15, wherein said applying step comprises passing the mixture through at least one of the roll mill and the press roll at least in two directions crossing at right angles to one other to form a sheet where the activated carbon fiber is randomly oriented.

17. The method for production of an adsorption material as in claim 15, wherein said applying step comprises repeatedly press rolling the sheet in the same direction so that activated carbon fiber contained in the sheet is mainly oriented in one direction.

18. The method for production of an adsorption material as in claim 11, wherein the mixture further comprises carbon powder having an average size that is not greater than the average fiber diameter of the activated carbon fiber.

19. The method for production of an adsorption material as in claim 11, wherein the adsorption material further comprises carbon powder in an amount of from 5 to 50 wt % based on the total weight of the activated carbon fiber and the carbon powder.

20. The method for production of an adsorption material as in claim 15, wherein the nip size of the roll mill is from 5 to 40 times the average diameter of activated carbon fiber.

21. The adsorption material as in claim 1, wherein the adsorption material is covered with a membrane filter.

22. The adsorption material as in claim 1, wherein a sheet obtained from said absorption material is covered with a membrane filter.

23. The adsorption material as in claim 1 wherein said polytetrafluoroethylene resin powder is obtained by emulsion polymerization.

24. The method for production of an adsorption material as in claim 11 wherein said polytetrafluoroethylene resin powder is obtained by emulsion polymerization.

25. The adsorption material as in claim 1 wherein the adsorption material is a sheet having a tensile strength of at least 10 g/mm$^2$.

26. The method for production of an adsorption material as in claim 11 wherein the adsorption material is a sheet having a tensile strength of at least 10 g/mm$^2$.

27. The method for production of an adsorption material as in claim 12, wherein said liquid is selected from the group consisting of water, an aqueous solution of an inorganic salt, and an organic solvent in which the fibrillating polytetrafluoroethylene is insoluble.

28. The method for production of an adsorption material as in claim 12 wherein said liquid is water.

* * * * *

UNITED STATES PATENT AND TRADEMARK OFFICE
CERTIFICATE OF CORRECTION

PATENT NO. : 5,482,906
DATED : January 9, 1996
INVENTOR(S) : Naoki Sakai, et al

It is certified that error appears in the above-indentified patent and that said Letters Patent is hereby corrected as shown below:

On the title page, item [73] Assignee, delete "Tayon" and insert —Rayon—.

Signed and Sealed this

Second Day of July, 1996

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,482,906
DATED : January 9, 1996
INVENTOR(S) : Sakai et al.

It is certified that error appears in the above-identified patent and that said Letters Patent is hereby corrected as shown below:

IN THE DRAWINGS

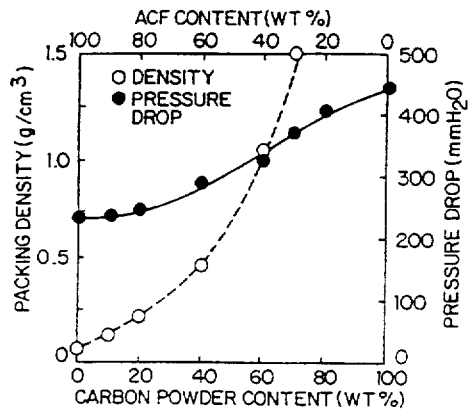

Delete

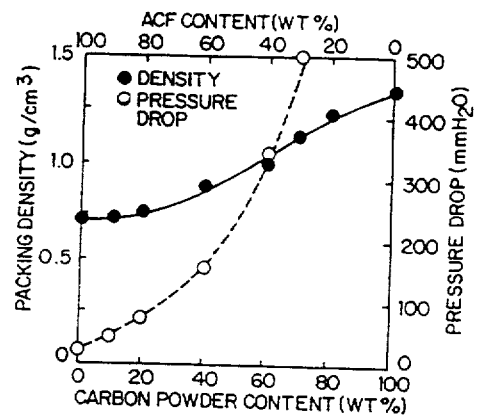

FIG. 13

Insert

IN THE SPECIFICATION:

Column 2, line 18, delete "g/cm" and insert therefor -- $g/cm^3$ --.

Column 4, line 1, delete "Lo ACF" and insert --to ACF--;

lines 34-36, delete "$cm^2/g$" and insert therefor -- $m^2/g$ --.

UNITED STATES PATENT AND TRADEMARK OFFICE
CERTIFICATE OF CORRECTION

PATENT NO. : 5,482,906
DATED : January 9, 1996
INVENTOR(S) : Sakai et al.

It is certified that error appears in the above-indentified patent and that said Letters Patent is hereby corrected as shown below:

Column 3, line 13, delete "foamed" and insert therefor --formed--.

Column 8, line 53, delete "c,r" and insert --or--.

Column 11, line 55, delete "to sea" and insert therefor --to seal--.

Column 13, line 38, delete "8 m" and insert --8 $\mu$m--.

Column 15, line 35, delete "5 m" and insert --5 $\mu$m--;

line 53, delete "Fine Guard" and insert --Finegard--.

Column 16, line 37, delete "0.2 m" and insert --0.2 $\mu$m--.

Column 17, line 7, delete "$S_2$" and insert --$SO_2$--.

Column 18, line 27, delete "(NC) and insert --(NO)--.

Signed and Sealed this

Twenty-ninth Day of October 1996

BRUCE LEHMAN

Attest:

Attesting Officer

Commissioner of Patents and Trademarks